US011101507B2

(12) United States Patent
Müller et al.

(10) Patent No.: US 11,101,507 B2
(45) Date of Patent: Aug. 24, 2021

(54) PROCESS FOR RECOVERING LITHIUM FROM LITHIUM-SULFUR ACCUMULATORS

(71) Applicant: ALBEMARLE GERMANY GMBH, Frankfurt am Main (DE)

(72) Inventors: Marc-Christian Müller, Ober-Hilbersheim (DE); Sebastian Pietzner, Zeilsheim (DE); Hannes Vitze, Idstein (DE); Vera Nickel, Haiger (DE); Martin Steinbild, Frankfurt (DE); Johannes Willems, Frankfurt (DE)

(*) Notice: Subject to any disclaimer, the term of this patent is extended or adjusted under 35 U.S.C. 154(b) by 213 days.

(21) Appl. No.: 16/522,100

(22) Filed: Jul. 25, 2019

(65) Prior Publication Data

US 2019/0348723 A1    Nov. 14, 2019

Related U.S. Application Data

(63) Continuation-in-part of application No. 15/523,101, filed as application No. PCT/EP2015/075465 on Nov. 2, 2015, now abandoned.

(30) Foreign Application Priority Data

Oct. 31, 2014    (DE) ................... 10 2014 222 301.6

(51) Int. Cl.
*H01M 10/54* (2006.01)
*H01M 10/052* (2010.01)
*C22B 26/12* (2006.01)

(52) U.S. Cl.
CPC ............. *H01M 10/54* (2013.01); *C22B 26/12* (2013.01); *H01M 10/052* (2013.01)

(58) Field of Classification Search
CPC .......... C22B 1/005; C22B 26/12; C22B 3/44; H01M 10/052; H01M 10/54; H01M 4/5815; Y02E 60/10; Y02P 10/20; Y02W 30/84
USPC ......................................................... 75/403
See application file for complete search history.

(56) References Cited

U.S. PATENT DOCUMENTS 7,192,564 B2 * 3/2007 Cardarelli ............... H01M 6/52
                                                                 423/111
8,557,412 B2 * 10/2013 Tsuchida ............. H01M 10/052
                                                                 429/49

FOREIGN PATENT DOCUMENTS

CN    102244309 A  * 11/2011

OTHER PUBLICATIONS

NPL: On-line English translation of CN 102244309 A, Nov. 2011 (Year: 2011).*

* cited by examiner

*Primary Examiner* — Jie Yang
(74) *Attorney, Agent, or Firm* — Marcy M. Hoefling

(57) ABSTRACT

The invention relates to a process for recovering lithium from lithium-sulfur accumulators, wherein the accumulators are discharged, shredded, and pre-cleaned by sieves or screens to separate housing and electricity collector parts, the remaining material is dispersed in an aqueous medium, resulting in formation of a lithium sulfide containing solution from which insoluble components are removed by filtration, and the electrolyte is removed by phase separation, followed by a process for separation of the lithium from the lithium sulfide-containing solution.

10 Claims, No Drawings

US 11,101,507 B2

PROCESS FOR RECOVERING LITHIUM FROM LITHIUM-SULFUR ACCUMULATORS

REFERENCE TO RELATED APPLICATIONS

This application is a continuation-in-part of U.S. application Ser. No. 15/523,101, dated Apr. 28, 2017, which is the National Stage of International Patent Appl. No. PCT/EP2015/75465, filed on Nov. 2, 2015, which in turn claims benefit of German Appl. No. 10 2014 222 301.6, filed on Oct. 31, 2014, the disclosures of which are incorporated herein by reference.

TECHNICAL FIELD

The subject of the invention is a process for recovering lithium from lithium-sulfur rechargeable batteries.

BACKGROUND

Mobile electronic devices require ever increasingly more powerful rechargeable batteries to ensure an independent current supply. For these purposes, lithium batteries are used, because of their volumetric energy density expressed in $Wh/m^3$, the cycle stability and the low self-discharge. Lithium-sulfur rechargeable batteries are considered to be galvanic elements with a very promising future. The active cathode material in these batteries consists of a lithium sulfide composite from which lithium ions are released during the charging process and transported into the anode and deposited there as metallic lithium or are stored in a host material such as, for example, silicon, tin or aluminum as alloy. Large-format lithium rechargeable batteries are used for stationary applications (power back-up) or in the automobile sector for traction purposes (hybrid drives or purely electrical drive). Since, with the size and the number of the batteries produced, used and subsequently depleted, the quantity of the reusable materials contained therein increases, there is a need for an economic process for recovering the lithium contained in the batteries.

From the document U.S. Pat. No. 8,557,412 B2, a process is known for treating battery components, in which the battery components comprise at least one lithium-containing active cathode material and a lithium-containing solid electrolyte material. The treatment occurs in that the mentioned battery components are treated with a process fluid such as water for the formation of hydrogen sulfide, and that lithium is leached from the solid electrolyte material and converted to lithium sulfide. The insoluble cathode material is then separated, and the lithium component is recovered.

The known process merely describes the processing of solid electrolyte cells with intercalation electrode materials.

It is the aim of the invention to indicate a process enabling the recovery of lithium from lithium-sulfur rechargeable batteries.

INVENTION

This invention is directed toward a process for recovering lithium from discharged lithium-sulfur rechargeable batteries comprising housing parts, current collector parts, and electrolyte, wherein the discharged lithium-sulfur rechargeable batteries are shredded and precleaned by sifting or sieving for separation of the housing parts and the current collector parts, characterized in that remaining material comprising the lithium and the electrolyte is dispersed in an aqueous medium with a $pH \geq 7$, resulting in formation of a lithium sulfide-containing solution the from which insoluble components are removed by filtration, and the electrolyte is removed by phase separation, followed by a process for the separation of the lithium from the lithium sulfide containing solution. Further, this invention is directed to such a process, characterized in that the separation of the lithium from the lithium sulfide-containing solution is carried out by thermal processing, including wherein the thermal processing is carried out in a temperature range from 100 to 1500° C. in the presence of oxygen, or wherein the thermal processing is carried out in a temperature range from 100 to 1500° C. with exclusion of oxygen; or characterized in that the separation of the lithium from the lithium sulfide-containing solution is carried out by chemical oxidation, including wherein the chemical oxidation is carried out by reaction with hydrogen peroxide, ozone or hydroxyl radicals; or characterized in that the separation of the lithium from the lithium sulfide-containing solution is carried out under acidic conditions, including wherein the acidic conditions are produced by adding sulfuric acid or hydrochloric acid to the lithium sulfide-containing solution, the lithium obtained is converted into the corresponding salts, and the formed polysulfur compounds are separated by extraction; or characterized in that the separation of the lithium from the lithium sulfide-containing solution is carried out by precipitation, including wherein the precipitation of the lithium from the lithium sulfide-containing solution is carried out by the addition of water-soluble carbonates to the lithium sulfide-containing solution.

The specified aim is attained by a process for recovering lithium from lithium-sulfur rechargeable batteries, in which the rechargeable batteries are discharged, shredded and precleaned by sifting or sieving for the separation of the housing and current collector parts, the remaining material is dispersed in an aqueous medium, preferably in the alkaline medium with a $pH \geq 7$ in order to prevent the release of hydrogen sulfide, resulting in the formation of a lithium sulfide-containing solution from which the insoluble components are removed by filtration, and the electrolyte is removed by phase separation, followed by a process for separating the lithium from the lithium sulfide-containing solution.

The separation of the lithium from the lithium sulfide-containing solution is preferably carried out by thermal processing in a temperature range of 100-1500° C. The thermal processing is carried out particularly preferably in the temperature range from 200 to 500° C. in the presence of oxygen. The processing can alternatively also be carried out in the temperature range from 100 to 1500° C. with exclusion of hydrogen. Alternatively, the thermal processing can also be carried out at a reduced pressure in comparison to the ambient pressure, in a temperature range of 20-500° C.

In spite of the presence of $CO_2$ in the medium flowing over (pressurized air), no carbonate formation is observed. This is remarkable, since lithium hydroxide, which forms during the thermal processing, usually reacts with $CO_2$ to form lithium carbonate. It is also surprising that, at a temperature of 500° C., only a small portion of the sulfur oxidizes with the oxygen present to form sulfate, and lithium hydroxide is formed as main component.

Alternatively, the separation of the lithium from the lithium sulfide-containing solution is carried out by chemical oxidation. Preferably, the chemical oxidation occurs by reaction with hydrogen peroxide or ozone. An alternative variant consists of oxidation via hydroxyl radicals.

According to the invention, the separation of the lithium from the lithium sulfide-containing solution is also carried out by processing under acidic conditions. Preferably, in the processing under acidic conditions, the lithium contained is converted into the corresponding salts by the addition of sulfuric acid or hydrochloric acid. Polysulfur compounds that are produced are separated by extraction. The predominantly formed hydrogen sulfide escapes from the mixture in the form of a gas.

Alternatively, the separation of the lithium from the lithium sulfide-containing solution is carried out by precipitation. In the process, lithium is precipitated from the lithium sulfide-containing solution as lithium carbonate by the addition of water-soluble carbonates.

Below, the process according to the invention is described in further detail in reference to five examples.

EXAMPLE 1

Thermal Processing of a Lithium Sulfide-Containing Solution at 200° C.

An aqueous lithium sulfide-containing solution with an Li content of approximately 3% by weight was heated in an oven with circulating air at a heating rate of 10 K/min, wherein min is used as an abbreviation for minute, to 200° C. After reaching the target temperature, the sample was kept for 1 h at the target temperature under continuous air flow. The waste gas was removed via a gas scrubber filled with alkaline washing solution. By means of a phase analysis by X-ray diffractometry (XRD), the solid was identified as lithium hydroxide. The isolated yield was 91%.

EXAMPLE 2

Thermal Processing of a Lithium Sulfide-Containing Solution at 500° C.

An aqueous lithium sulfide-containing solution with an Li content of approximately 3% by weight was heated in an oven with circulating air at a heating rate of 5 K/min to 500° C. After reaching the target temperature, the sample was kept for 1 h at the target temperature under a continuous air flow. The waste gas was removed via a gas scrubber filled with alkaline washing solution. The main phase of the residue consisted of lithium hydroxide, and 3 LiOH x $Li_2SO_4$ was identified as secondary phase by X-ray diffractometry. The isolated yield was 77%.

EXAMPLE 3

Obtention of $Li_2SO_4$ from a Lithium Sulfide-Containing Solution by Chemical Oxidation 20 g of an aqueous lithium sulfide-containing solution with an Li content of approximately 3% by weight were cooled to 0° C. in a temperature-controlled glass reactor. Under constant stirring, 40 g of a half-concentrated hydrogen peroxide solution (15% by weight) were added to the cold solution within 20 min. Due to the strongly exothermic reaction, a temperature rise to 60° C. was observed. After 1 hour of stirring, the solution was reduced and dried until the weight was constant. By means of a phase analysis by X-ray diffractometry, the solid was identified as lithium sulfate, which was present in the form of both $Li_2SO_4$ and $Li_2SO_4$ x $H_2O$. The isolated yield was 91%.

EXAMPLE 4

Obtention of $Li_2CO_3$ from a Lithium Sulfide-Containing Solution by Carbonate Precipitation 20 g of an aqueous lithium sulfide-containing solution with an Li content of approximately 3% by weight were placed in a reactor. Under constant stirring, the lithium-containing solution was mixed with 11.5 g sodium carbonate. The suspension obtained was centrifuged, and the sediment was dried at 80° C. until the weight was constant. By means of a phase analysis by X-ray diffractometry, the solid was identified as lithium carbonate. The isolated yield was 92%.

EXAMPLE 5

Obtention of LiCl from a Lithium Sulfide-Containing Solution by Acidic Processing 20 g of an aqueous lithium sulfide-containing solution with an Li content of approximately 3% by weight were placed in a temperature-controlled reactor. The reactor was equipped with a distillation unit and with a dosing unit. Via a waste gas line, a gas scrubber with aqueous alkaline washing solution was connected. Under constant stirring, 21.2 g of half-concentrated hydrochloric acid (15% by weight) were metered in within 10 minutes via a dosing system. The mixture was reduced to dryness, and the product was dried until the weight was constant.

By means of a phase analysis by X-ray diffractometry, the solid obtained was identified as lithium chloride, which was present in the form of both LiCl and LiCl x $H_2O$. The isolated yield was 84%.

The invention claimed is:

1. A process for recovering lithium from discharged lithium-sulfur rechargeable batteries comprising housing parts, current collector parts, and electrolyte, wherein the discharged lithium-sulfur rechargeable batteries are shredded and precleaned by sifting or sieving for separation of the housing parts and the current collector parts, characterized in that remaining material comprising the lithium and the electrolyte is dispersed in an aqueous medium with a pH≥7, resulting in formation of a lithium sulfide-containing solution from which insoluble components are removed by filtration, and the electrolyte is removed by phase separation, followed by a process for separation of the lithium from the lithium sulfide-containing solution.

2. The process according to claim 1, characterized in that the separation of the lithium from the lithium sulfide-containing solution is carried out by thermal processing.

3. The process according to claim 2, characterized in that the thermal processing is carried out in a temperature range from 100 to 1500° C. in the presence of oxygen.

4. The process according to claim 2, characterized in that the thermal processing is carried out in a temperature range from 100 to 1500° C. with exclusion of oxygen.

5. The process according to claim 1, characterized in that the separation of the lithium from the lithium sulfide-containing solution is carried out by chemical oxidation.

6. The process according to claim 5, characterized in that the chemical oxidation is carried out by reaction with hydrogen peroxide, ozone or hydroxyl radicals.

7. The process according to claim 1, characterized in that the separation of the lithium from the lithium sulfide-containing solution is carried out under acidic conditions.

8. The process according to claim 7, characterized in that the acidic conditions are produced by adding sulfuric acid or hydrochloric acid to the lithium sulfide-containing solution, the lithium obtained is converted into the corresponding salts, and the formed polysulfur compounds are separated by extraction.

9. The process according to claim 1, characterized in that the separation of the lithium from the lithium sulfide-containing solution is carried out by precipitation.

10. The process according to claim 9, characterized in that the precipitation of the lithium from the lithium sulfide-containing solution is carried out by the addition of water-soluble carbonates to the lithium sulfide-containing solution.

* * * * *